United States Patent
Behnke

(10) Patent No.: US 6,863,604 B2
(45) Date of Patent: Mar. 8, 2005

(54) METHOD AND APPARATUS FOR DETERMINING OPTIMAL ADJUSTMENTS OF WORK UNITS IN AN AGRICULTURAL HARVESTING MACHINE

(75) Inventor: Willi Behnke, Steinhagen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/255,870

(22) Filed: Sep. 26, 2002

(65) Prior Publication Data

US 2003/0066277 A1 Apr. 10, 2003

(30) Foreign Application Priority Data

Sep. 27, 2001 (DE) .......................................... 101 47 733

(51) Int. Cl.[7] .................................................. A01F 7/00
(52) U.S. Cl. ....................................... 460/6; 56/10.2 R
(58) Field of Search ................................ 400/1, 4, 5, 6, 400/7, 149; 56/10.2 R, 10.2 B, 10.2 C, 10.2 D, 10.2 E, 10.2 G

(56) References Cited

U.S. PATENT DOCUMENTS

| | | | | |
|---|---|---|---|---|
| 4,466,230 A | * | 8/1984 | Osselaere et al. ............... | 460/5 |
| 4,527,241 A | * | 7/1985 | Sheehan et al. ............... | 701/50 |
| 5,586,033 A | * | 12/1996 | Hall ............................. | 701/50 |
| 5,666,793 A | * | 9/1997 | Bottinger .................. | 56/10.2 R |
| 5,704,200 A | * | 1/1998 | Chmielewski et al. ... | 56/10.2 E |
| 5,775,072 A | * | 7/1998 | Herlitzius et al. ....... | 56/10.2 R |
| 6,167,337 A | * | 12/2000 | Haack et al. ................. | 701/50 |
| 6,167,685 B1 | * | 1/2001 | Berger et al. ............ | 56/10.2 A |
| 6,205,384 B1 | * | 3/2001 | Diekhans ...................... | 701/50 |
| 6,431,981 B1 | * | 8/2002 | Shinners et al. ............... | 460/6 |
| 6,553,300 B2 | * | 4/2003 | Ma et al. ....................... | 701/50 |

FOREIGN PATENT DOCUMENTS

| | | |
|---|---|---|
| DE | 44 31 824 | 5/1996 |
| DE | 197 05 841 | 8/1998 |
| DE | 198 00 238 | 8/1999 |
| DE | 198 07 145 | 9/1999 |
| DE | 199 21 466 | 11/2000 |
| DE | 19922436 A1 * | 11/2000 |

* cited by examiner

*Primary Examiner*—Thomas B. Will
*Assistant Examiner*—Nathan Mammen
(74) *Attorney, Agent, or Firm*—Husch & Eppenberger, LLC; Robert C. Haldiman

(57) ABSTRACT

A method for selecting an optimal setting of an adjustable work unit in an agricultural harvesting machine, wherein each setting of the work unit results in a work result, includes adjusting a first set parameter of the work unit on the machine to a first work setting; recording a first, stable work result; adjusting the first set parameter of the work unit to a second work setting; recording a second, stable work result; comparing the first and second work results; and selecting between the first and second work settings based on the comparison of the first and second work results.

A device for selecting an optimal setting of an adjustable work unit in an agricultural harvesting machine includes means for adjusting a first set parameter of the work unit to different work settings; a control device to determine a work result as a function of a work setting; and a memory device in communication with the control device to record the work result.

47 Claims, 4 Drawing Sheets

METHOD AND APPARATUS FOR DETERMINING OPTIMAL ADJUSTMENTS OF WORK UNITS IN AN AGRICULTURAL HARVESTING MACHINE

TECHNICAL FIELD OF THE INVENTION

The present invention relates generally to agricultural machinery and, more particularly, to a method and apparatus for determining optimal adjustments of work units in an agricultural harvesting machine.

DESCRIPTION OF THE RELATED ART

Agricultural harvesting machines are increasingly self-propelled harvesting machines and have, for the processing of various crops, one or more adjustable work units. The different processable crops require, to obtain a good work result, that the individual work units are adjusted in adaptation to the respective crop properties or crop species. For this purpose the individual work units are equipped with adjusting means which can be controlled manually or remotely from the driver's cab.

Agricultural harvesting machines of this kind are as a rule equipped by the manufacturers with adjustment aids in the form of hand lists from which the operator can deduce how he can preset the individual work units of the agricultural harvesting machine according to the crop species to be harvested.

Some makers of agricultural harvesting machines offer special training for the operators for this purpose. In this training, the manner of operation and the possibilities for individual adjustment of the agricultural harvesting machine are explained to the participants, and further instructions are given for eliminating poor work results. For instance, the causes of excessive crop losses on a combine harvester are indicated, and possible alterations of set parameters with the respective effects on the crop loss as well as on the whole work result are indicated.

A further adjustment aid for the operator of the agricultural harvesting machine is assessing the work result with reference to the crop which is transported away from the field of growing. Destruction, admixtures or other structural properties of the harvested or chopped crop can be detected by visual checking and give information on the manner of operation of the harvesting machine. Training or experience more or less enabled the operator to make the adjustments of the harvesting machine in such a way that the work results of the harvesting machine according to the work targets were achieved.

With the advent of electronic control terminals and memory means in agricultural harvesting machines, today it is possible to dispense with so-called hand lists. Thus, for example it is known from German Patent No. 198 00 238 C1 that from a memory device arranged in a combine harvester, with the input of a crop species and further crop-specific variables as well as at least one target standard for the planned harvesting mode, at least one set parameter for adjustment of a combine harvester can be selected out of a plurality of stored set parameters. If changes in harvesting conditions are detected by the operator of the combine harvester or if he ascertains an unsatisfactory work result, he has the option of altering the set parameters manually and filing this setting in the memory device for later reuse. He further has the option at any time of calling up at least one new, pre-allocated set parameter from the memory device by entering/presetting new selection criteria.

The above options show adjustment aids in various forms. The operator of an agricultural harvesting machine can in each case manually or automatically access set parameters which have been determined beforehand empirically or with the aid of experience of individual operators or of the manufacturer and stored by suitable means for later reuse. If however the agricultural harvesting machine does not show the allocated, hoped-for or desired work result during operation, then the operator of the agricultural harvesting machine only has the option of altering the individual set parameters by hand according to experience. However, some operators of agricultural harvesting machines do not have the necessary qualifications and corresponding experience in dealing with the harvesting machine and particularly with the different harvesting conditions, particularly at the beginning of the harvest, so that in many cases the required manual adaptation of agricultural harvesting machines to the harvesting conditions is not made or not made correctly and existing harvesting power remains unused, poor work results are obtained or even unnecessary harvesting losses are produced.

In order now to achieve complete independence of adjustment of the harvesting machine of the operator's qualifications, various controls or automatic regulations on agricultural harvesting machines can be found in the state of the art. For example, German Patent No. 197 05 841 A1 discloses a method for a combine harvester, which provides for regulating the adjustment of a processing step as a function of the result of the current or previous processing step. Here it is provided inter alia that the cleaning fan speed is controlled as a function of going uphill or downhill and further also the speed of travel is allowed to affect this speed. Further, regulation of the speed of travel of the combine harvester as a function of the harvesting losses or tailings load is proposed. Generally, automatic control requires knowledge of the relationships, and automatic regulation additionally requires knowledge of the regulating distance. Detection of the respective nominal and actual values is also a prerequisite for satisfactory operation thereof. The fact that the relationships in a combine harvester are only partly mathematically described and allow only some process variables to be detected, results in the fact that the proposed control or regulation systems cause improved adjustment of the combine harvester and relieve the pressure on the operators only under certain working conditions. In many cases these devices cause completely erroneous adjustments of the work units and lead to inadequate work results of the harvesting machine.

The present invention is directed to overcoming one or more of the problems set forth above.

SUMMARY OF THE INVENTION

An aspect of the present invention is to provide a method and apparatus which gives an operator of an agricultural harvesting machine the option of finding an improved setting for at least one work unit which is adapted to the instantaneous working conditions, compared with a first set parameter standard.

Another aspect of the present invention is to provide a method and apparatus that allows even an unskilled operator of a harvesting machine to advantageously recognize very quickly whether at all, when and to what extent a varied set parameter of a work unit has an effect on a work result.

Yet another aspect of the present invention is to provide a method and apparatus whereby an operator of a harvesting machine acquires basic knowledge of the instantaneously prevailing harvesting conditions and of the effects of set parameters of work units on a work result.

In accordance with the above aspects of the invention, there is provided a method for selecting an optimal setting of an adjustable work unit in an agricultural harvesting machine, wherein each setting of the work unit results in a work result, includes the steps of harvesting a generally constant crop quantity; adjusting a first set parameter of an adjustable work unit on the agricultural harvesting machine to a first work setting; recording a first, stable work result; adjusting the first set parameter of the adjustable work unit to a second work setting; recording a second, stable work result; comparing the first and second constant work results; and selecting between the first and second work settings based on the comparison of the first and second work results.

A device for selecting an optimal setting of an adjustable work unit in an agricultural harvesting machine utilizes a method according to an embodiment of the invention and includes means for adjusting a first set parameter of the work unit to different work settings, wherein each work setting results in a work result; a control device to determine a work result as a function of a work setting; a memory device in communication with the control device to record the work result; and wherein a first set parameter of the work unit is adjusted by the means for adjusting to a first work setting, the control device determines a first work result, and the memory device records the first work result and further wherein the work unit is adjusted by the means for adjusting to a second work setting, the control device determines a second work result, the memory device records the second work result, and the control device selects an optimal work setting from the first and second work settings as a function of a comparison of the first and second work results.

These aspects are merely illustrative of the innumerable aspects associated with the present invention and should not be deemed as limiting in any manner. These and other aspects, features and advantages of the present invention will become apparent from the following detailed description when taken in conjunction with the drawings.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
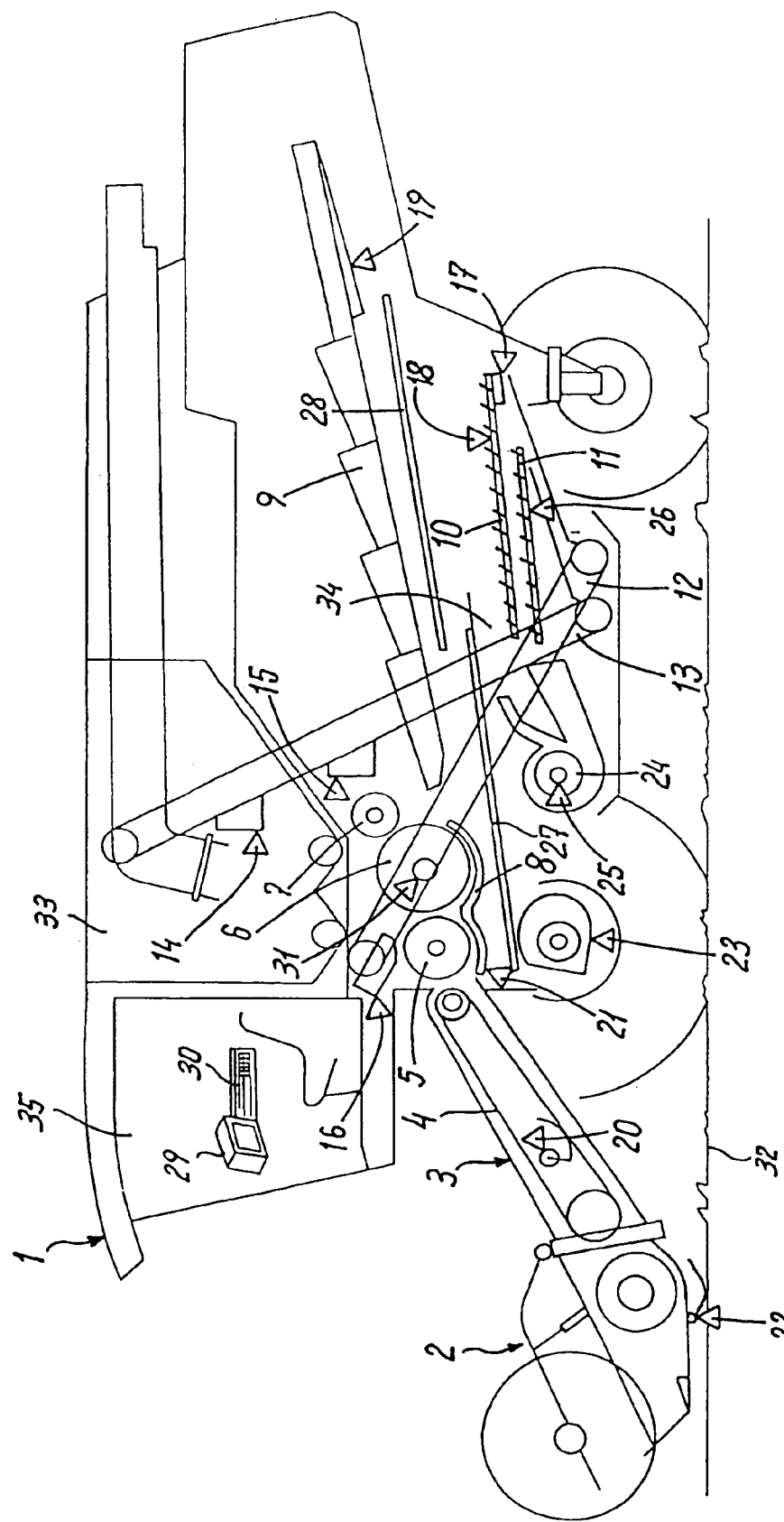
FIG. 1 is a schematic view of an agricultural harvesting machine incorporating an embodiment of the present invention.

FIG. 1 illustrates a combine harvester 1. The combine harvester 1 picks up crop growing on stalks from a cultivated area 32 and separates it from straw and other admixtures. A cereal cutterbar 2 cuts off the crop stalks and combines it to the width of the feed rake 3. In the feed rake 3 are located rotating feed chains 4 with cross webs which deliver the crop to subsequent threshing units 5, 6. The crop is taken off by the forward accelerator cylinder 5 at the end of the feed rake 3 and accelerated along the circumference of the forward accelerator cylinder 5 between the forward accelerator cylinder 5 and the concave 8. The accelerated crop is then transferred to the threshing cylinder 6 and further accelerated. Due to the percussive and abrading action of the forward accelerator cylinder 5 and the threshing cylinder 6 and the centrifugal force acting on the crop, the crop is separated from the ears and from the straw and then passes through the concave 8 which lets the crop through onto the grain pan 27. The straw discharged by the threshing cylinder 6 is braked by the beater 7 and diverted to several straw walkers 9 arranged adjacent to each other across the working width. The oscillating motion of the straw walkers 9 and their step-like construction cause transport of the straw towards the rear end of the combine harvester and separation of the crop which is still located in the straw. This residual quantity is likewise transferred to the grain pan 27 by the return pan 28 and an oscillating motion thereof. The crop located on the grain pan 27 with the other admixtures such as pieces of straw, chaff and ear portions is separated by an oscillating motion thereof and its step-like construction and delivered to the subsequent cleaning units 10, 11, 24. Transfer is affected via a straw walker step 34 aerated by the cleaning fan 24, onto the upper sieve 10. The latter and the lower sieve 11 located thereunder are as a rule chaffers each with separately adjustable mesh sizes, wherein the upper sieve 10 can be adjusted in the rear region with a mesh size which differs from the remaining mesh size of the upper sieve 10. The lower and upper sieves 10, 11 are traversed by an air stream produced by the cleaning fan 24. The oscillating motion of the sieves 10, 11 and the air stream cause transport of the crop and its admixtures towards the rear end of the harvesting machine. Due to the straw walker step 34, large and light admixtures are picked up by the air stream before they reach the upper sieve 10 and separated from the combine harvester 1. Smaller and heavier crop components pass from the grain pan 27 over the straw walker step 34 onto the upper sieve 10. Depending on the setting of the upper sieve mesh, the individual crop grains and other components of the crop fall through the latter and so pass onto the lower sieve 11. Straw and unthreshed ears are moved past the front sieve region and fall in the rear region of the upper sieve 10 through the upper sieve 10 directly into the so-called tailings. The lower sieve 11 as a rule has a finer sieve lamella structure than the upper sieve 10 and is normally set with a smaller mesh size than the upper sieve 10. Larger and light crop components such as crop grains with husks, ear portions or stalk portions are, if they have passed through the upper sieve 10 onto the lower sieve 11, transferred by the oscillating motion and the air stream into the so-called tailings. The cleaned crop itself falls directly through the lower sieve 11 and is transported by means of a feed auger and the grain elevator 13 into the grain tank 33. The crop which has passed into the tailings is delivered to the threshing process again by means of a feed auger and the tailings elevator 12 above the forward accelerator cylinder 5.

The combine harvester 1 is equipped with a driver's cabin 35 which includes a control and monitor device 29 as well as an operating and display device 30. There are additional devices for presetting the direction and speed of travel of the machine 1 which are not shown in more detail and are known in the art. The control and monitor device 29 as well as the display and operating device 30 are connected to individual sensors and actuators arranged at various locations in the combine harvester 1. The operator of the combine harvester 1 thus acquires the option of being able to adjust and monitor the manner of operation of the combine harvester 1. Arrow points in FIG. 1 illustrate the individual locations in the combine harvester 1 where sensors for determining process and set parameters are arranged. The respective actuators for adjusting the combine harvester 1 are sufficiently well known in the art.

Associated with the cutterbar 2 is a cutting height measuring device 22. This device 22 serves to determine the actual distance between the cutterbar 2 and the cultivated area 32. The sensed value can be indicated to the operator by means of the monitor device 29 or the display device 30 and further used as an actual value for automatic cutting height regulation. A crop quantity measuring device 20 is mounted in the feed rake 3 to detect a crop quantity M. The crop quantity measuring device 20 determines the deflection of a feed chain 4, which depends on the crop quantity M. A further sensor mechanism is arranged on the concave 8. This concave width measuring device 21 has a single or multiple construction and determines the distance between the forward accelerator cylinder 5 and the concave 8 and/or the threshing cylinder 5 and the concave 8 at one or more locations. The forward accelerator cylinder 5, the threshing cylinder 6 and the beater 7 are as a rule driven by a common drive, wherein the speeds of rotation of the cylinders 5, 6, 7 can be varied by means of an adjusting drive. Associated with these cylinders 5, 6, 7 is a threshing cylinder speed measuring device 31 for detection of at least one of the cylinder speeds. For the production of different air streams by the cleaning device, the drive of the cleaning fan 24 is of variable-speed construction. The actual speed of the cleaning fan 24 is detected by means of a cleaning fan measuring device 25. Further sensors can be associated with the cleaning device. Thus the respective sieve mesh size can also be detected by an upper sieve mesh measuring device 18 and a lower sieve mesh measuring device 26. These measuring devices 18, 26 can form part of the respecting adjusting device, not shown, or be constructed separately and arranged respectively on the sieve 10, 11. At the rear end of the upper sieve 10 is arranged an upper sieve loss measuring device 17. By this means the crop grains which leave the combine harvester 1 past the cleaning device and are lost can be detected proportionately. Such sensors are known to the expert and extend partly or completely across the working width of the cleaning device. They are normally constructed as a baffle plate or tube and evaluate the oscillations which are produced by the impact of crop grains on the plate or tube. This sensor technology can further be used and arranged at any location in a combine harvester 1. As a result, crop grain streams can then be detected and allow at least a comparative and relative statement on the grain quantities prevailing at the point of use. Thus this sensor technology is also used in the straw walkers 9 to detect separation. To obtain a statement on the remaining crop grains still located in the straw, a straw walker loss sensor 19 is attached at least to the rear end of a straw walker 9. This sensor 19 detects proportionately the remaining crop grains still separated at the end of the straw walker 9. Also for assessment of the crop grain quantity in the tailings, such a baffle plate sensor mechanism can be arranged at the end of the lower sieve 11 or at the point of return of the tailings to the threshing process.

For assessment of the crop components located in the tailings, a tailings measuring device 16 is arranged at the upper end of the tailings elevator 12. By this means the tailings volume and the grain and broken grain fractions can be determined. Optical light barriers, optical sensors or X-ray sensors (NIR sensors) are used for this purpose. The grain elevator 13 is equipped with further sensors 14, 15 which allow determination of the quantity transported by a yield measuring system 14 and determination of the relative density of the crop by calibrating scales 15.

Figure 2:
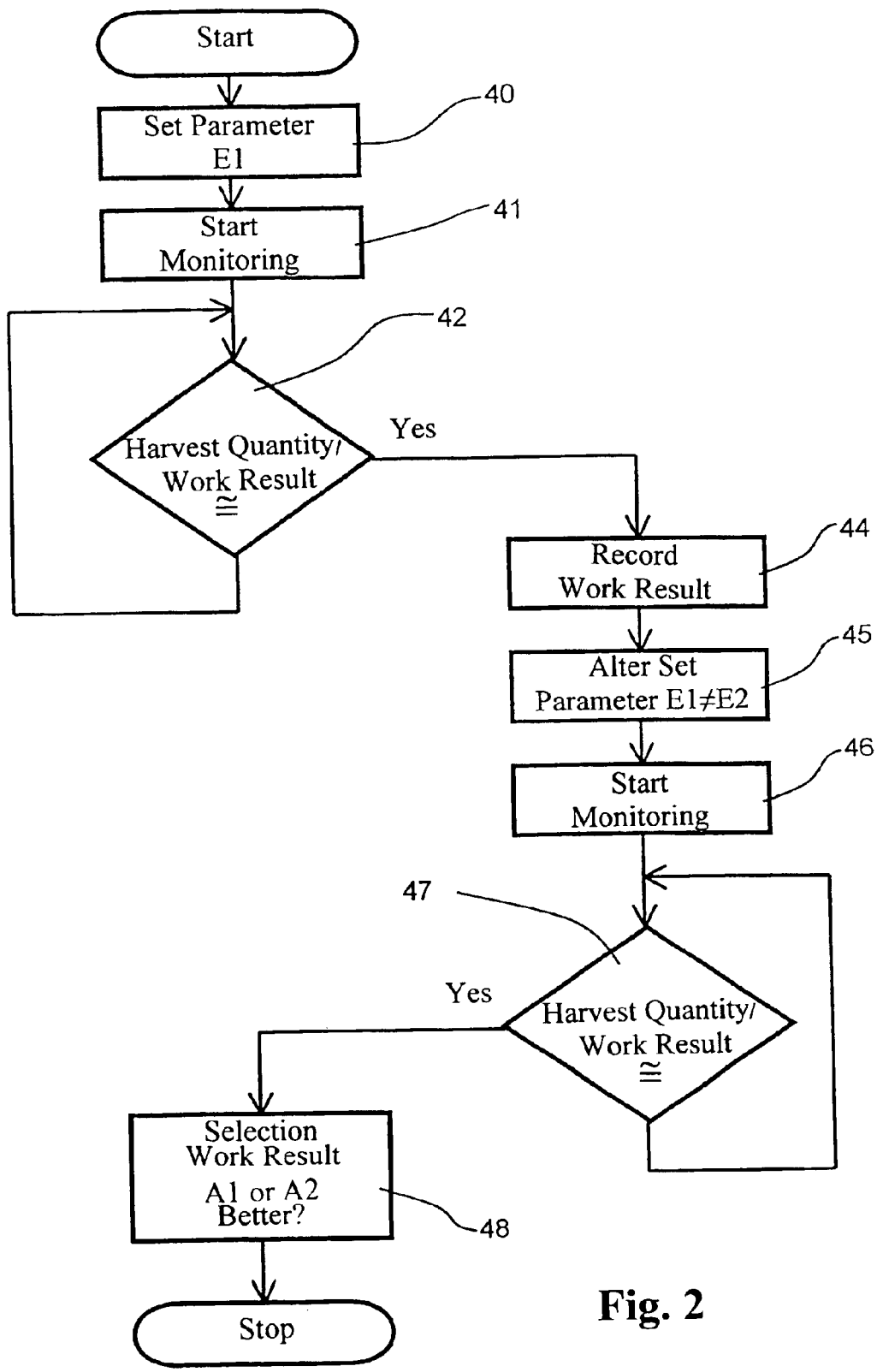
FIG. 2 is a flow chart of a method of determining optimal adjustments of work units in an agricultural harvesting machine according to another embodiment.

FIG. 2 illustrates a flow chart of a method for determining optimal adjustments of the work units. To activate a device which operates by the method according to the invention, for an operator of the agricultural harvesting machine 1 there is the option of starting a corresponding associated submenu by means of the control and monitor device 29. In a first process step 40 the operator of the harvesting machine adjusts a work unit 6, 8, 10, 11 or 24 according to a first set parameter E1. In this case, naturally he can also adopt the already adjusted set parameter E1 from a previously made manual setting or crop species-related standard setting from a previous menu. Then he starts, in a second process step 41, monitoring at least one work result. In order for the work result to be converted to an almost constant result, the operator of the agricultural harvesting machine 1 must, after starting, ensure that the harvesting machine 1 admits an almost constant crop quantity M. He achieves this, for example when working with a combine harvester 1, by harvesting in a constant standing crop, firstly with a constant working width of the front attachment, i.e. with a constant cutting width of the cereal cutterbar 2, and secondly with a constant working speed. Furthermore he must take care that the cutting height is almost constant. The operator of the combine harvester 1 can perform monitoring of the crop quantity M and work results with the aid of visual checks or sensor values indicated in the driver's cabin, for example by a loss display or an ordinary visual check of the tailings device which can be inspected. Further, the operator must take care that, when determining the work results, the respective other work units are operated at least with a crop species-related standard setting. If he then detects in a first decision step 42 an at least almost constant work A1, then in a further, third process step 44 he causes the recording of at least one work result A1. For this purpose the operator of the combine harvester 1 uses known means, for example a note on a slip of paper, rotating a manual needle on a needle instrument to the location of the value indicated, or filing the work result in an existing memory device. Then in a fourth process step 45 he causes the work unit 6, 8, 10, 11 or 24 to be adjusted with a second set parameter E2 different from the set parameter E1. Monitoring of the at least one work result is started by the operator of the agricultural harvesting machine 1 again in a fifth process step 46. In a second decision step 47 a recognized, almost constant work result leads to a last process step 48. In this sixth process step 48 the operator of the agricultural harvesting machine 1 has the option of comparing the recorded work result A1 with the instantaneous work result A2 and declaring that one of the two work results A1 or A2 is better. As shown in more detail in FIG. 3, several work results can also be recorded for one set parameter E1. Furthermore the method described according to the invention can be employed as often as desired and for any different set parameters. Thus, for example it is provided that, for a unit 6, 8, 10, 11, 24, work results are determined according to the invention after a preset number of set parameters E1 to EX with fixed set values in each case successively and independently of a proposed crop species-related setting. In conjunction with the selected work unit 6, 8, 10, 11, 24 and the selected set parameter, one or more work results are then recorded, with the aid of which a set parameter is then selected for a unit 6, 8, 10, 11, 24.

The presetting of set parameters E1 to EX whereby according to the invention a better set parameter is to be determined can further be affected by free presetting by the operator of the combine harvester 1 or by automatic presetting of set parameters around the instantaneously adjusted set parameter. For example, the threshing cylinder speed of the combine harvester 1 is preselected from a memory means, indicating a crop species, and set where E1=1200 r.p.m. Upon starting the method according to the invention, this set parameter E1 is preset as the basis of further set values E2 to EX, where for example E2=1150 r.p.m., E3=1100 r.p.m., E4=1250 r.p.m. and E5=1300 r.p.m. For each set parameter E1 to EX, at least one work result A1 is then determined and recorded by the method according to the invention. In this case the operator is free to decide whether to use each preset set parameter according to the invention. If for example he ascertains that the work results are far from the targets, he can skip preset set parameters or preset his own new set parameters himself.

Selection of the set parameter E1 to EX with which the operator of the combine harvester 1 would like to carry on working, after determining work results according to the invention, can be carried out by him freely or automatically by the control device 29, for example taking target standards into consideration. Thus, for example it is provided that, in determining set parameters E1 to EX according to the invention for the threshing cylinder speed or for the concave distance, the set parameter which led to the highest relative density of the crop 52 and/or to the highest yield quantity is selected as the best set parameter, maintaining a limit for the loss signals 71, 72 for the tailings quantity and/or for the tailings grain quantity in the combine harvester 1, wherein the existing grain fracture, the relative density of the crop 52 and the yield are noted in the foreground during selection.

In determining set parameters according to the invention for the cleaning device 10, 11, 24, for example the set parameter for the speed of the cleaning fan 24 or a set parameter for the sieve mesh size of the lower or upper sieve 10, 11, it is provided that the set parameter E1 to EX which led to the lowest tailings quantity 54 is selected as the best set parameter, maintaining a limit for the loss signals 71, 72, and/or the tailings grain quantity in the combine harvester 1. Moreover or additionally the cleanness of the grain can be taken into consideration as a further selection criterion. The cleanness of the crop constitutes a further work result and can be determined by a visual check by the operator or by suitable sensors. From the quantity of the relative density of the crop 52, assuming that the heaviest components of the crop are the crop itself, can be deduced the statement with respect to cleanness that the work result with the higher relative density 52 is also the work result with the higher cleanness. Contaminants such as chaff, straw or ear portions have a lower density and cause, in combination with the crop, a decrease in relative density of the crop 52. The operator of the combine harvester 1 also has the option of allocating work results which are not detected by a sensor to a set parameter 61, 62, 63 by free input. Manual recordings or special submenu points in a control and monitor device 29 can be provided for this. The operator then, for example from an existing list, allocates the valuation of adequate, satisfactory, good or very good to the set parameter 61, 62, 63 as a work result for cleanness.

Figure 3:
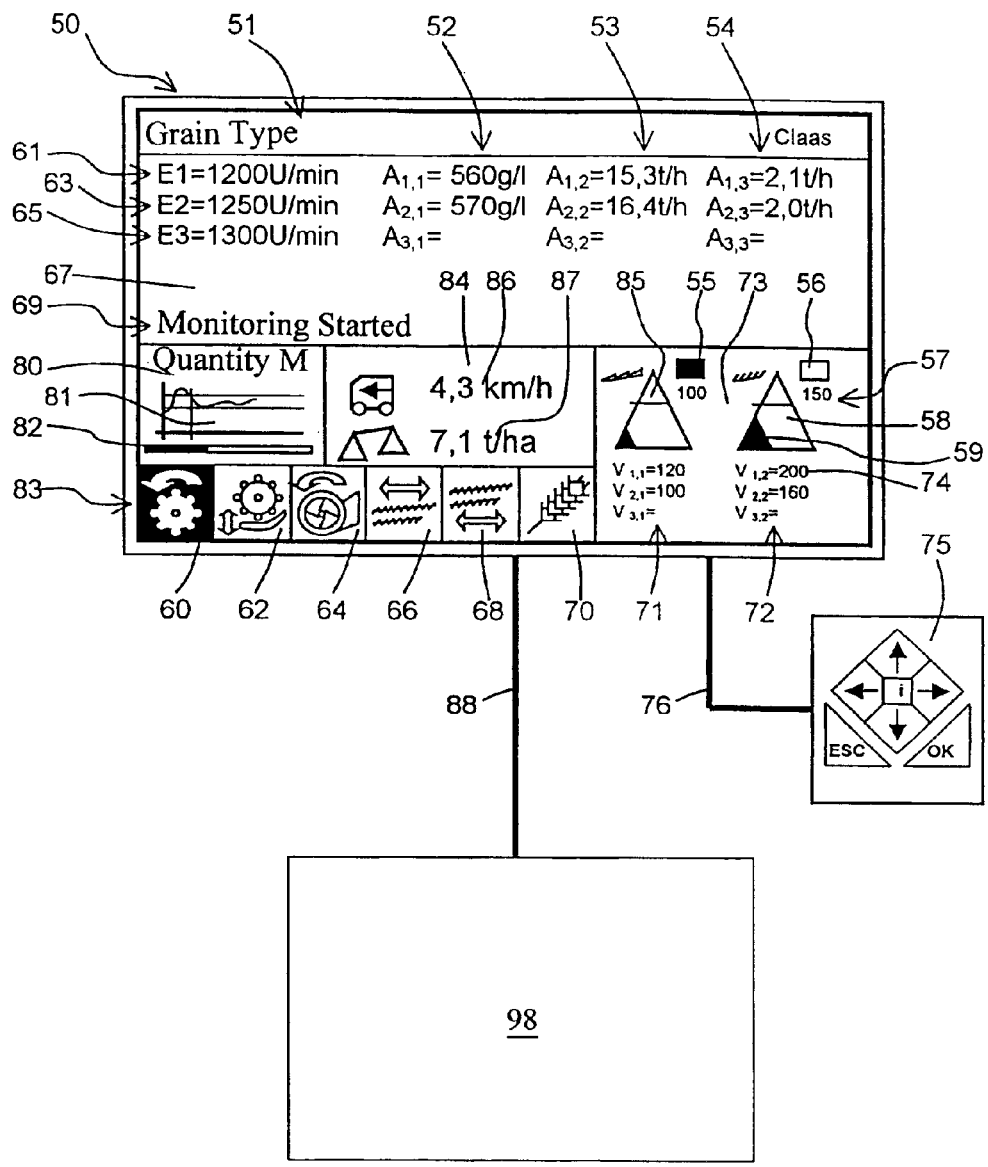
FIG. 3 is a schematic view of a display monitor in an apparatus for determining optimal adjustments of work units in an agricultural harvesting machine according to another embodiment.

In FIG. 3 is shown a design of the device according to the invention in a combine harvester 1. The monitor 50 shown is part of the control and monitor device 29 in the driver's cabin 35 of the combine harvester 1 and divided into several display panels 67, 73, 80, 83 and 84. The individual contents of the respective display panels 67, 73, 80, 83 and 84 are dependent on the selected menu. By means of a control panel 75 connected to the monitor 50 by an electrical connection 76, the operator of the combine harvester 1 can activate various modes of the control and monitor device 29 and display them on the monitor 50 in the form of associated displays. Further, by this means he can select and alter settings of the harvesting machine 1. In the top bar of the monitor 50 is displayed the crop species wheat 51, previously selected via the crop species menu panel 70. From the menu display panel 83 the operator of the harvesting machine 1 can each time select for which set parameter of the combine harvester 1 an improved setting is to be determined by the method according to the invention. By a first threshing cylinder menu panel 60, the operator of the combine harvester 1 can select an improvement of the set parameter of threshing cylinder speed. A second concave menu panel 62 is provided for an improvement of the set parameter of "concave distance". The third cleaning fan menu panel 64 serves for preselection of the finding according to the invention of an improved cleaning fan speed. By the upper sieve 66 and lower sieve 68 menu panels, findings according to the invention for an improved set parameter can be carried out in each case for the mesh size of the sieves.

The monitor 50 shows in FIG. 3 the events in a combine harvester 1 during determination of an improved setting for the threshing cylinder speed by the method according to the invention. This can be seen by the negated display of the threshing cylinder menu panel 60. In the event panel display 67 are shown in table form set parameters 61, 63, 65 in connection with the respective work results 52, 53, 54. Furthermore, by means of a status display 69 the operator of the combine harvester 1 is guided through questions and statements during running by the method according to the invention, and the progress of determination of set parameters and work results is displayed. It can be deduced from this event panel display 67 shown that the method according to the invention is carried out and completed for a first set parameter 61 and a second set parameter 62. Instantaneously the threshing cylinder speed is set to 1300 r.p.m., and according to the status display 69 monitoring of the crop quantity M and work results is started. As yet no work results are indicated for the set parameter E3 in the event display 67 shown, as they do not yet fulfil the condition of "almost constant". Alternatively, the current values for the work results 52, 53, 54 can also be indicated by a respectively flashing display. If the work result then fulfils the condition, the display then changes to a permanent display.

The respective current machine and work results can be taken from the display panels 73, 80 and 84. The crop quantity M picked up by the combine harvester 1 is displayed in a graph 81 in the crop quantity display panel 80. The crop quantity M is here plotted against time and can thus be followed by the operator of the combine harvester 1. The tolerance limits for the crop quantity M are indicated in the graph 81 by two horizontal lines. With the aid of these limits shown, the operator and/or the control device 98 can recognize whether an almost constant crop quantity is being processed by the combine harvester 1. The vertical line in this graph 81 indicates that the crop quantity from this moment on lies within the tolerance band. From this moment on, time monitoring is started at the same time, which checks for how long the crop quantity M is already within the tolerance band. The bar display 82 arranged in this display panel 80 shows, by the filled-in bar portion, the lapsed time in which the crop quantity is already within the tolerance band. Due to the total length of the bar, the required time for fulfilling the almost constant condition is provided. A filled-in bar thus indicates that the condition of an almost constant crop quantity is fulfilled. In the display panel 84 the operator of the combine harvester 1 has the speed of travel 86 and the current yield 87 displayed continually. With the aid of these displays 86, 87 the operator of the combine harvester 1 can monitor to what extent the combine harvester 1 is run at a constant speed of travel and the yield of the cultivated area 32 varies.

In a further losses display panel 73, the operator of the combine harvester 1 has the current straw walker loss indicated in a first loss display 85 and the current upper sieve loss indicated in a further loss display 58. Depending on which set parameter of a unit 6, 8, 10, 11, 24 is selected for improvement, further values, for example the lower sieve losses or results of the tailings measuring device 16, can also be displayed in suitable displays in this display panel 73. Depending on the crop species and possibly further target standards, a limit value 57 for the loss value is provided or indicated by a numerical display and/or a horizontal line in the respective display triangle. Within the respective display 58, 85, the relative current loss value is indicated by a filled-in black triangle 58, positioned in the bottom left corner. The display panel 73 contains, below the respective loss display 58, 85, a list with loss results 71, 72 for the straw walker losses and for the upper sieve losses. A set parameter 61, 62 or 63 can be allocated to each of these loss values 74, recognizable by the indexing $V_{x,y}$. These loss results 71, 72 thus constitute further work results of the combine harvester 1. Moreover a condition display 55, 56 is allocated to the respective loss display 58, 85. The condition display 55 indicates, by the filled-in display, that the condition preset for the straw walker losses, for example an almost constant work result, is already fulfilled. This condition is governed by fixed standards, for example by the current loss value, the dynamics of this value and the curve of crop quantity. It can be seen from the bar display 82 that the crop quantity has already been within the tolerance band for a certain time, a relatively low loss value can be seen from the current loss display for the straw walkers, and moreover it already turned out that the loss value is very constant, and therefore it cannot be expected that the straw walker loss will undergo an even greater variation. The condition of almost constant work result is therefore already reached for this work result. For the upper sieve loss, the condition display 55 indicates an as yet unfulfilled condition.

From the displays 67 and 73, for two set parameters 61, 63 there are associated work results 52, 53, 54, 71, 72. The first work result 52 indicates the relative density of the crop in g/l. The second work result 53 indicates the crop throughput in t/h. As a third work result 54 the measured tailings throughput is indicated. The loss results 71, 72 are shown only relatively.

The operator of the combine harvester 1 can now already recognize from the two sets of work results that, with the increase in threshing cylinder speed from 1200 r.p.m. to 1250 r.p.m., an increase in relative density of the crop 52 and throughput 53 and at the same time a decrease in losses was obtained. If then the work results 52, 53, 54, 71, 72 are available for the third set parameter E3, the operator of the combine harvester 1 is asked via the status display 69 by means of the control panel 75 to indicate a further set parameter E4 or select a set parameter 61, 62 or 63 as the best set parameter.

In a further embodiment of the invention the respective value of the next set parameter is fixed by a special inquiry routine. In the process the operator of the combine harvester 1 assesses the measured work results 52, 53, 64, 71, 72 with the aid of questions, for example the response "results OK?", "grain fracture OK?", "losses OK?", "losses too low?" or "harvesting speed too slow?", by simple yes/no answering. The control device 98 then automatically selects a new value for the set parameter, for which new work results 52, 53, 54, 71, 72 are then determined with the aid of the method according to the invention.

Figure 4:
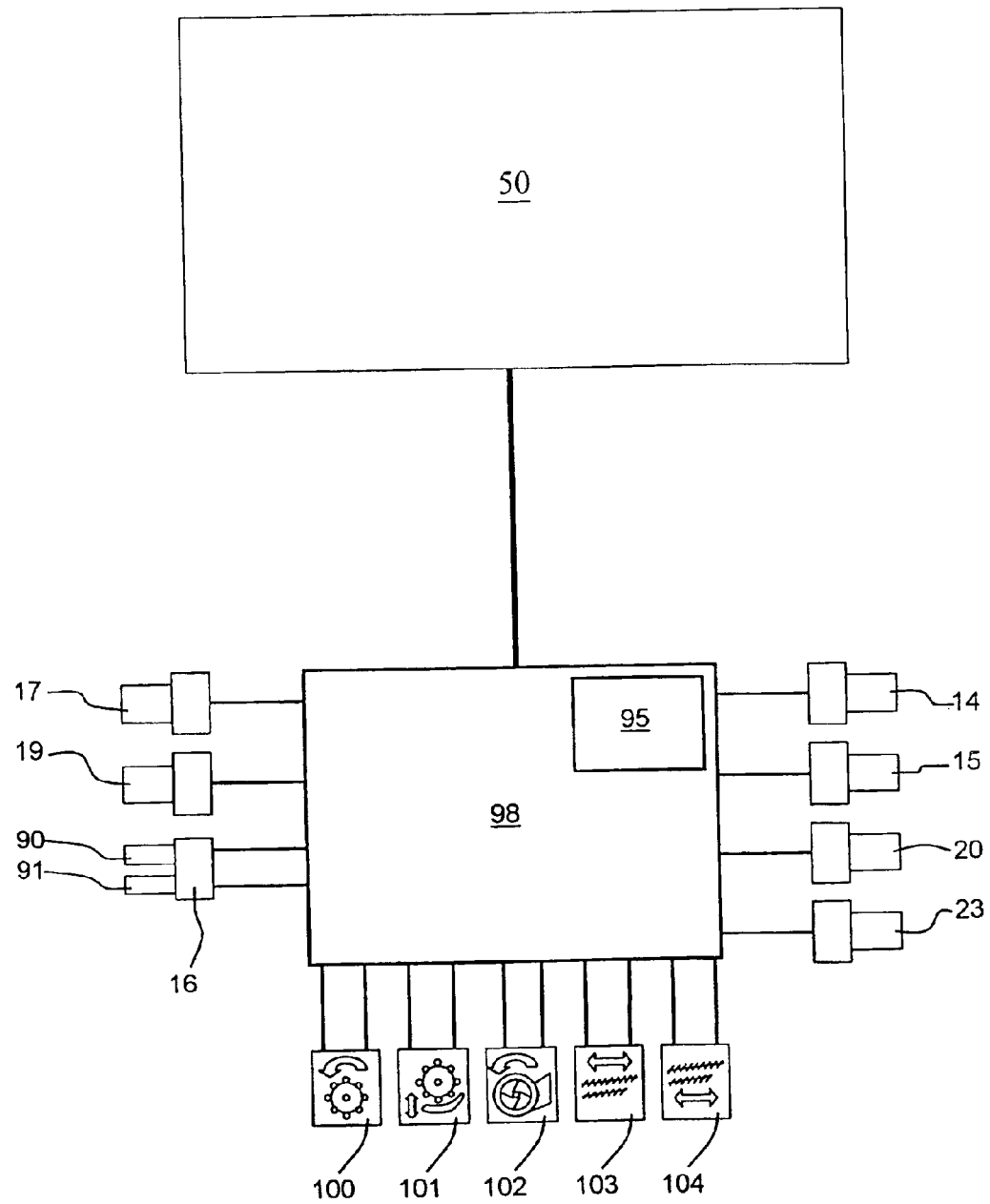
FIG. 4 is a schematic view of a control device in an apparatus for determining optimal adjustment of work units in an agricultural harvesting machine according to another embodiment.

As illustrated in FIG. 4, the monitor 50 is connected by a further electrical connection 88 to a control device 98. This connection is constructed as a multi-core line known to the expert or some other known data link, and serves for bidirectional data exchange between the monitor 50 and the control device 98. Within this control device 98 is arranged at least one memory device 95 for recording work results $A_{1,1}$ to $A_{x,y}$ and/or crop species-specific set parameters for the work units 6, 8, 10, 11, 24 of the combine harvester 1. The control device 98 is connected inter alia to further sensors 14, 15, 16, 17, 19, 20, 23 and further devices in the combine harvester 1 for the detection of harvesting machine-specific, crop-specific and/or harvesting process-specific parameters, wherein the individual parameters in a known manner via further electrical connections can also be transmitted to further devices or further parameters can be received from further devices. This data exchange is for example known from the CAN bus systems used on harvesting machines.

Connected to the control device 98 is a tailings measuring device 16 which is in turn composed of a sensor for determining the tailings throughput 91 and a sensor for determining the tailings grain quantity 90. Both sensors 90, 91 can also be constructed separately and determine parameters of the tailings at different locations in the combine harvester 1. Further connected sensors are the loss measuring devices 17, 19 arranged on the upper sieve 10 and on the straw walkers 9 as well as a yield measuring system 14 connected to the grain elevator 13. To determine the relative density of the crop 52, a certain quantity of the crop is delivered to calibrating scales 15 and the measured value is detected by the control device 98. The control device 98 is further connected to a measuring device 20 for detecting the crop quantity M and to a measuring device 23 for detecting the speed of travel.

Further control means 100–104 are subordinately connected to the control device 98. The electrical connections necessary for this are by way of example in each case constructed in double form in FIG. 3 and constitute firstly the transmission path for a set parameter from the control device 98 to the respective control means 100–104 as a nominal set parameter and secondly the transmission path from the respective control means 100–104 to the control device 98 as an actual set parameter. Irrespective of the harvesting mode, an operator of the combine harvester 1 can select from the memory device 95 for example respectively a crop species-related set parameter for the threshing cylinder speed, the concave distance, the cleaning fan speed, the upper sieve mesh size and the lower sieve mesh size and transmit it to the threshing cylinder control means 100, the concave control means 101, the cleaning fan control means 102, the upper sieve control means 103 and the lower sieve control means 104. The respective control means 100–104 thereupon causes the respective nominal set parameter for the work unit 6, 8, 10, 11, 24 to be adjusted by existing suitable adjusting means and detected as an actual set parameter by suitable measuring devices 18, 21, 25, 26, 31 and transmitted to the control device 98. Combining the individual control means 100–104 into a common control means or direct linking of the individual control means 100–104 into the control device 98 are a simplification of the design and are at the discretion of the expert executing it.

The above explanations of the individual figures all relate to the use and application of the invention to a combine harvester 1. But it is obvious to an expert that this invention can be transferred to all kinds of harvesting machines, for example forage harvester, having at least one work unit with a set parameter for influencing the work result. Thus, it is also quite conceivable to determine settings on a front attachment, for example a cutterbar 2, and on the feed and conveying elements, by means of the method according to the invention.

In one embodiment, the standard value of at least one set parameter for the at least one work unit, for a first work result of the agricultural harvesting machine, is kept on standby so that it can be selected from a memory device as a function of at least one crop property and/or at least one crop-specific variable. The method according to the invention can easily be integrated in an existing device of an agricultural harvesting machine. By for example entering at least one crop property and other variables, at least one first set parameter can be called up from a memory device, which from experience initially lets an adequate work result be expected. In very few cases, however, does this setting meet the requirements of the desired work results such as crop cleanness and amount of loss. In particular, this is caused by new crop varieties and particular harvesting conditions such as ripeness, harvesting weather and/or the state of the harvesting machine such as age, wear and/or equipment. With the aid of this method, new set parameters can be determined and filed in the memory device. The memory device can further serve to record the work results.

In another embodiment, it is provided that the varied set parameter of the work unit is recorded in conjunction with the work result. By this means advantageously the operator obtains the option, when determining several work results, of being able to call up the respective set parameter with sustained allocation to the corresponding work result.

In yet another embodiment, the crop quantity which the agricultural harvesting machine admits and/or at least one work result of the agricultural harvesting machine is detected by at least one sensor and indicated to the operator of the agricultural harvesting machine in each case in the driver's cabin for monitoring. Due to respective sensors, the operator advantageously acquires the option of having the crop quantity and/or at least one work result indicated in the driver's cabin of the harvesting machine. For example, the crop quantity is determined by a device which senses the deflection of the feed chain in a feed channel.

In an alternate embodiment, the admission of an almost constant crop quantity by the agricultural harvesting machine is determined by at least one device, and maintenance is indicated at least to the operator by suitable means. The presence of an almost constant work result of the agricultural harvesting machine, of at least one work result, can also be determined by at least one device and maintenance thereof indicated at least to the operator by suitable means. Maintenance of the process condition is advantageously assessed also at any time and constitutes a further relief of pressure on the operator of the harvesting machine. The operator of the agricultural harvesting machine is further advantageously given an aid by which he can carry out determination of an improved set parameter more rapidly. If maintenance of the almost constant crop quantity is determined and indicated by the device according to an embodiment, the operator can begin to carry out the next process step. Maintenance of the almost constant crop quantity by the harvesting machine can advantageously be monitored at any time by an ordinary display.

In a further embodiment, in the respective device the admission of an almost constant crop quantity by the agricultural harvesting machine and/or the presence of at least one almost constant work result is determined with reference to a respectively preset tolerance band and a preset period of time. Advantageously, from these standards arises an adjustable standard for determining the "almost constant" process condition. By means of the display and control device, advantageously there is also the option of indicating the tolerance band relative to the instantaneous sensor value. The operator can then estimate within what range the work result or crop quantity fluctuates and then advantageously adopt measures for maintaining or attaining the "almost constant" condition. Also a simultaneous display of the time in which the sensor value was located all in one within the tolerance band can be a further indicated value. Variable presetting of the tolerance band and period of time as a function of the selected crop species and/or the respectively selected set parameter and/or a harvest target standard, is also conceivable.

In a further embodiment, after the occurrence and recording of a first work result of the agricultural harvesting machine, at least one set parameter of the work unit to be adjusted is automatically altered, an almost constant work result is waited for again and the new work result arising is recorded as a further work result. By this means, advantageously a further reduction in process time and dependence on the operator of the agricultural harvesting machine is obtained. Automated variation of the set parameter here always takes place according to the same standards.

In a particular advantageous embodiment, the set parameter is varied automatically according to a preset number, quantity and direction as a function of the work unit to be adjusted. By this means, advantageously the altered settings are in each case adapted to the set parameter and varied purposefully in conjunction with the work unit to be adjusted.

The operator of the agricultural harvesting machine decides how frequently and to what extent he decides upon determination of the adjustment of a set parameter. In a further embodiment of the method, with the aid of the recorded work results a varied set parameter for the work unit is selected automatically. In this case, in a device according to the method described at least two work results are held comparatively, and the set parameter which led to the better work result is selected automatically with the aid of filed criteria. One or more criteria can be preset manually or automatically by the crop species and/or by at least one target standard and selected accordingly. This yields the advantage that a further simplification when carrying out the method and a further increase in independence of the operator are obtained. Assessment of the work results is advantageously fully automated and carried out independently of the operator. The set parameter for obtaining a better work result of the agricultural harvesting machine is then automatically proposed to the operator.

A further embodiment, includes determining a relationship between the varied set parameters and the work results, with the aid of the recorded work results, and with the aid of this relationship a set parameter which with the aid of this relationship leads to the best work result is selected. If now there are several work results determined in conjunction with one set parameter, then as a rule a relationship can be determined between the set parameter and the work result. This relationship can be described at least partially or in some areas as a mathematical relationship. The individual recorded work results, as well as a mathematical relationship therefor, can be displayed graphically for further evaluation on an operator display. By manual selection or further mathematical treatment, for example by determining extreme or turning points, advantageously a set parameter leading to an improved work result can be selected and/or calculated.

In another embodiment, several set parameters of an adjustable work unit are altered simultaneously and again an almost constant work result of the agricultural harvesting machine during operation is waited for. The effect on a work result can be further reinforced by this means advantageously in a few process cycles. Thus, for example, on a cleaning device of a combine harvester, the effect of the cleaning fan speed and the upper sieve mesh size on crop cleanness is known at least from experience. A counteracting adjustment of the set parameters reinforces the effect on crop cleanness. By simultaneous adjustment advantageously more rapid proximity of the setting to a desired work result can be achieved.

In yet another embodiment, the determination of an improved setting of at least one adjustable work unit is controlled automatically, and the set parameter determined is indicated to the operator of the agricultural harvesting machine and/or the work unit is automatically adjusted according to this set parameter. As a result, ultimately complete independence of the method of the invention from the operator is achieved. The operator has only to take care that the harvesting machine admits an almost constant crop quantity during automatic determination of a set parameter. But it is also conceivable that a constant crop quantity can be controlled selectively and maintained largely automatically by the harvesting machine, by known feed control, track guide and/or forward travel regulating systems on agricultural harvesting machines.

In a further embodiment of the invention it is provided that several set parameters of a work unit and/or the set parameters of several work units are determined in a certain order one after the other. It is particularly advantageous to proceed in a certain order. This order is decided by the respective harvesting machine and the selected operating mode. Often it happens that the determination of a first set parameter, after adjustment of further set parameters has taken place, again leads to a worse work result. Advantageously, therefore, the determination of set parameters for the work unit which comes into contact with the crop first is also determined first, and then the set parameters for the subsequent work units. This can be illustrated in particular by the example of a combine harvester. The settings of the threshing units such as threshing cylinder speed and concave width affect the crop composition delivered to the cleaning device and hence also the manner of operation of the cleaning device. Therefore, it is particularly advantageous to first find and adjust the set parameters of the threshing units and then determine the set parameters of the cleaning device.

In a particular embodiment, the set parameters of a combine harvester, such as at least one concave width or threshing cylinder speed of the threshing units, are determined, wherein the concave width and/or threshing cylinder speed for the threshing unit is selected with reference to the relative density of the crop and/or the yield quantity. In selection it is further considered whether the loss signals, the tailings quantity and/or the tailings grain quantity in the combine harvester in conjunction with the selected set parameter, the threshing cylinder speed or the concave width, were below a fixed respective limit. For selection of the set parameter for the threshing unit, first the highest measured value for the relative density and/or yield quantity is sought, and then it is checked whether the losses and/or tailings parameters are within preset limits. If this is not the case, the next value down can be selected. However, sometimes it appears to be particularly advantageous to select and adjust first the set parameter which belongs to the work results with the associated highest relative density and/or highest yield quantity, without taking the losses or tailings parameters into consideration. Often the subsequent determination of set parameters for the cleaning device and adjustment thereof according to the invention then causes a fall below the required limits for the work results of the cleaning device, such as losses, tailings quantity and tailings grain quantity.

In a further advantageous embodiment, set parameters for a cleaning device on a combine harvester are determined. In this case, the respective set parameter for the cleaning fan speed, the upper sieve mesh and/or the lower sieve mesh which has led to the lowest tailings quantity is selected and adjusted. In this case the further work results of the cleaning device, such as the losses and the tailings grain quantity, can also be taken into consideration due to possibly falling below a respective preset limit, so that it can perfectly well be that it is not the lowest value for the tailings quantity, but a higher value that is selected and the associated set parameter adjusted in order to be able to comply with the standards of limit values. The general standard of limit values is governed by the target standards with which the combine harvester is to be operated or harvesting carried out.

Other objects, features and advantages of the present invention will be apparent to those skilled in the art. While preferred steps of the present invention have been illustrated and described, this has been by way of illustration and the invention should not be limited except as required by the scope of the appended claims and their equivalents.

What is claimed is:

1. A method for selecting an optimal setting of an adjustable work unit in an agricultural harvesting machine, said machine having a processor and an electronic memory, wherein each setting of the work unit results in a work result, including the steps of:

harvesting a generally constant crop quantity, said constant crop quantity being determined by a user from a display showing a crop quantity harvested within a time period;

adjusting a first set parameter of an adjustable work unit on the agricultural harvesting machine to a first work setting;

recording a first, stable work result;

adjusting the first set parameter of the adjustable work unit to a second work setting;

recording a second, stable work result;

comparing the first and second constant work results; and selecting between the first and second work settings based on the comparison of the first and second work results.

2. A method for selecting an optimal setting of an adjustable work unit in an agricultural harvesting machine as set forth in claim 1, further including the steps of:

storing at least one standard work setting in a memory device; and selecting the standard work setting from the memory device as a function of at least one crop-specific variable.

3. A method for selecting an optimal setting of an adjustable work unit in an agricultural harvesting machine as set forth in claim 1, further including the steps of:
sensing a crop quantity being harvested by the agricultural harvesting machine;
calculating said first work result as a function of said sensing step over time; and
indicating the crop quantity and first work result to an operator of the agricultural harvesting machine.

4. A method for selecting an optimal setting of an adjustable work unit in an agricultural harvesting machine as set forth in claim 3, further including the steps of:
determining whether the crop quantity being harvested by the agricultural harvesting machine is generally constant over a time period; and
indicating whether the crop quantity is generally constant to the operator.

5. A method for selecting an optimal setting of an adjustable work unit in an agricultural harvesting machine as set forth in claim 4, wherein the step of determining whether the crop quantity being harvested by the agricultural harvesting machine is generally constant includes referencing a preset tolerance band.

6. A method for selecting an optimal setting of an adjustable work unit in an agricultural harvesting machine as set forth in claim 1, wherein the steps of adjusting the set parameter of the adjustable work unit to the second work setting and recording the second work result are performed automatically by a control device.

7. A method for selecting an optimal setting of an adjustable work unit in an agricultural harvesting machine as set forth in claim 1, wherein the step of adjusting the set parameter of the adjustable work unit to the second work setting includes referencing a preset number, quantity and direction as a function of the adjustable work unit.

8. A method for selecting an optimal setting of an adjustable work unit in an agricultural harvesting machine as set forth in claim 1, wherein the step of selecting between the first and second work settings based on the comparison of the first and second work results is performed automatically by a control device.

9. A method for selecting an optimal setting of an adjustable work unit in an agricultural harvesting machine as set forth in claim 1, wherein the step of selecting between the first and second work settings based on the comparison of the first and second work results includes referencing at least one crop specific selection criterion.

10. A method for selecting an optimal setting of an adjustable work unit in an agricultural harvesting machine as set forth in claim 1, further including the steps of:
determining a correlation between the first and second work settings and the first and second work results; and
determining a third work setting which will result in an optimal work result as a function of the correlation between the first and second work settings and the first and second work results.

11. A method for selecting an optimal setting of an adjustable work unit in an agricultural harvesting machine as set forth in claim 1, further including the steps of:
adjusting at least a second set parameter of the adjustable work unit to a first work setting;
recording a first stable work result resulting from the first work setting of the second set parameter;
adjusting the second set parameter of the work unit to a second work setting at approximately the same time that the first set parameter is adjusted;
recording a second stable work result resulting from the second work setting of the second set parameter.

12. A method for selecting an optimal setting of an adjustable work unit in an agricultural harvesting machine as set forth in claim 1, wherein the step of selecting between the first and second work settings based on the comparison of the first and second work results is performed automatically by a control device and further including the step of indicating the selected work setting to an operator of the agricultural harvesting machine.

13. A method for selecting an optimal setting of an adjustable work unit in an agricultural harvesting machine as set forth in claim 1, wherein the step of selecting between the first and second work settings based on the comparison of the first and second work results is performed automatically by a control device and further including the step of automatically adjusting the first set parameter of the adjustable work unit to the selected work setting.

14. A method for selecting an optimal setting of an adjustable work unit in an agricultural harvesting machine as set forth in claim 1, further including the steps of adjusting a plurality of set parameters of the work unit in a predetermined, sequential order and recording a resulting stable work result for each adjusted set parameter before adjusting the next set parameter.

15. A method for selecting an optimal setting of an adjustable work unit in an agricultural harvesting machine as set forth in claim 1, further including the step of determining at least one crop throughput performance value, and wherein the step of selecting a work setting includes referencing the crop throughput performance value to determine a work selling that resulted in an optimal crop throughput performance value.

16. A method for selecting an optimal setting of an adjustable work unit in an agricultural harvesting machine as set forth in claim 15, wherein the work unit is a threshing concave and the set parameter is a concave width.

17. A method for selecting an optimal setting of an adjustable work unit in an agricultural harvesting machine as set forth in claim 15, wherein the work unit is a threshing cylinder and the set parameter is a speed of the threshing cylinder.

18. A method for selecting an optimal setting of an adjustable work unit in an agricultural harvesting machine as set forth in claim 15, wherein the work unit is a cleaning sieve and the set parameter is a sieve mesh size.

19. A method for selecting an optimal setting of an adjustable work unit in an agricultural harvesting machine as set forth in claim 15, wherein the work unit is a cleaning fan and the set parameter is a speed of the cleaning fan.

20. A method for selecting an optimal setting of an adjustable work unit in an agricultural harvesting machine as set forth in claim 15, wherein the crop throughput performance value determined is a loss signal.

21. A method for selecting an optimal setting of an adjustable work unit in an agricultural harvesting machine as set forth in claim 15, wherein the crop throughput performance value determined is a quantity of tailings.

22. A method for selecting an optimal setting of an adjustable work unit in an agricultural harvesting machine as set forth in claim 15, wherein the crop throughput performance value determined is a quantity of grain in tailings.

23. A method for selecting an optimal setting of an adjustable work unit in an agricultural harvesting machine as set forth in claim 15, wherein the crop throughput performance value determined is a relative density of crop.

24. A method for selecting an optimal setting of an adjustable work unit in an agricultural harvesting machine as set forth in claim 15, wherein the crop throughput performance value determined is a yield quantity.

25. A method for displaying work results associated with work unit settings for adjustable work units in an agricultural harvesting machine having a processor and an electronic memory comprising:
   recording in an electronic memory a first setting of at least one adjustable work unit;
   establishing an upper and a lower tolerance limit for a quantity of a designated crop being harvested in a defined time period;
   sensing a quantity of the designated crop being harvested;
   displaying on a user interface said tolerance limits and said sensing of the quantity of the designated crop being harvested in said defined time period;
   receiving in said electronic memory a user input of a first stable work result, said first stable work result being a particular quantity of the designated crop that has been harvested in said defined time period;
   associating in said electronic memory said first stable work result with said recording of the first setting;
   recording in said electronic memory at least one other setting of the at least one adjustable work unit;
   sensing at least one other quantity of the designated crop being harvested with the adjustable work unit adjusted to said other setting;
   receiving in said electronic memory a user input of at least one other stable work result;
   associating in said electronic memory said at least one other setting with said at least one other stable work result; and
   displaying on said user interface said first stable work result and said first user setting and said at least one other stable work result and said at least one other user setting.

26. The method for selecting an optimal setting of an adjustable work unit in an agricultural harvesting machine as set forth in claim 25, further including the step of determining at least one crop throughput performance value, and wherein the step of selecting a work setting includes referencing the crop throughput performance value to determine a work setting that resulted in an optimal crop throughput performance value.

27. The method for selecting an optimal setting of an adjustable work unit in an agricultural harvesting machine as set forth in claim 25, wherein the work unit is a threshing concave and the set parameter is a concave width.

28. The method for selecting an optimal setting of an adjustable work unit in an agricultural harvesting machine as set forth in claim 25, wherein the work unit is a threshing cylinder and the set parameter is a speed of the threshing cylinder.

29. The method for selecting an optimal setting of an adjustable work unit in an agricultural harvesting machine as set forth in claim 25, wherein the work unit is a cleaning sieve and the set parameter is a sieve mesh size.

30. The method for selecting an optimal setting of an adjustable work unit in an agricultural harvesting machine as set forth in claim 25, wherein the work unit is a cleaning fan and the set parameter is a speed of the cleaning fan.

31. The method for selecting an optimal setting of an adjustable work unit in an agricultural harvesting machine as set forth in claim 25, wherein the crop throughput performance value determined is a loss signal.

32. The method for selecting an optimal setting of an adjustable work unit in an agricultural harvesting machine as set forth in claim 25, wherein the crop throughput performance value determined is a quantity of tailings.

33. The method for selecting an optimal setting of an adjustable work unit in an agricultural harvesting machine as set forth in claim 25, wherein the crop throughput performance value determined is a quantity of grain in tailings.

34. The method for selecting an optimal setting of an adjustable work unit in an agricultural harvesting machine as set forth in claim 25, wherein the crop throughput performance value determined is a relative density of crop.

35. The method for selecting an optimal setting of an adjustable work unit in an agricultural harvesting machine as set forth in claim 25, wherein the crop throughput performance value determined is a yield quantity.

36. An apparatus for display and selection of optimal work unit settings for work units in an agricultural harvesting machine comprising:
   a microprocessor;
   an electronic memory in operative communication with said processor;
   a user interface in operative communication with said processor and said memory and having an input and a display;
   said microprocessor being configured to receive a first work unit setting from said user interface and to store said first work unit setting in said memory;
   said processor being further configured to receive from at least one sensor a first crop throughput performance measurement and to store said performance measurement in said memory in association with said first work unit setting;
   said processor being further configured to receive at least one other work unit setting and at least one other crop throughput performance measurement and to store in said memory said at least one other performance measurement in association with said at least one other work unit setting; and
   said microprocessor being further configured to display said first work unit setting, said first performance measurement, said at least one other work unit setting and said at least one other performance measurement;
   wherein a user may enter a crop throughput performance measurement based upon a crop throughput performance measurement shown on said display.

37. The apparatus of claim 36 wherein said microprocessor is configured to receive said input of said first work unit setting and said at least one other work unit setting from said user interface.

38. The apparatus of claim 36 wherein said first crop throughput performance measurement and said at least one other crop throughput performance measurement is a quantity.

39. The apparatus of claim 38 wherein said quantity is determined to be above a lower threshold and below an upper threshold for a preconfigured period of time.

40. The apparatus of claim 38 wherein said quantity is displayed to a user via said user interface.

41. The apparatus of claim 36 wherein a next work unit setting is entered by a user.

42. The apparatus of claim 36 wherein said microprocessor is configured to select a next work unit setting according to a preconfigured preference between said first performance measurement and said at least one other performance measurement.

43. The apparatus of claim 36 wherein said processor is configured to select a next work unit setting according to an optimization interpolation, said optimization interpolation being calculated using the recorded first measurement and recorded at least one other measurement.

44. The apparatus of claim 36, wherein the work unit is a threshing concave and said working unit setting is a concave width.

45. The apparatus of claim 36, wherein the work unit is a threshing cylinder and said work unit setting is a speed of the threshing cylinder.

46. The apparatus of claim 36, wherein the work unit is a cleaning sieve and said work unit setting is a sieve mesh size.

47. The apparatus of claim 36, wherein the work unit is a cleaning fan and said work unit setting is a speed of the cleaning fan.

* * * * *